2,744,144

PURIFICATION OF PHENOL

Donald H. Sheffield, Wilmington, Del., assignor to Hercules Powder Company, Wilmington, Del., a corporation of Delaware No Drawing. Application December 28, 1953, Serial No. 400,785

6 Claims. (Cl. 260—621)

This invention relates to the purification of phenol and more particularly to the purification of phenol obtained by oxidation of cumene and subsequent cleavage of the hydroperoxide produced.

Phenol produced by oxidizing cumene to the hydroperoxide and subsequently cleaving the hydroperoxide frequently contains genetic impurities which are not separable from the phenol by distillation. While these impurities are usually present in only minute amounts, they effectively prevent the purification of phenol to meet U. S. P. specifications by fractional distillation alone.

Now in accordance with the present invention it has been found that phenol containing these genetic impurities is readily purified by contacting the impure phenol in the liquid phase with hexane, allowing the resulting mixture to separate into two phases, and separating the phenol from the phenol phase.

In carrying out the process of this invention impure phenol is contacted with a hexane under conditions that permit the impurities to dissolve in the hexane and the mixture is then allowed to separate into layers or phases under conditions that are conducive to separation. The phenol layer or phase which separates is then separated free of the impurities which have substantially the same boiling range as the phenol. The phenol is further purified to meet U. S. P. specifications by distillation.

The process in accordance with this invention is more particularly described in the following examples. In this specification all parts and percentages are by weight.

Example I

Crude phenol prepared by oxidation and cleavage of cumene containing about 0.2 mole per cent diisopropylbenzene and 0.7 mole per cent sec-butylbenzene contained genetic impurities such that the phenol after distillation did not meet U. S. P. specifications. To 359 parts of this crude phenol was added 17.9 parts water and 359 parts hexane. The mixture was agitated at 26° C. for one minute and the layers allowed to separate. The phenol layer was removed and subjected to distillation at 15 mm. mercury pressure. The fraction boiling at 79° C. (15 mm. mercury pressure) met the U. S. P. specifications for phenol and amounted to 65% of the crude phenol subjected to the treatment.

Example II

Example I was repeated using 327 parts phenol and 32.7 parts water and 327 parts hexane. The phenol which after distillation met U. S. P. specifications amounted to 75% of the crude phenol treated.

Example III

Equal parts of crude phenol of Example I and hexane were shaken at 35° C. and allowed to separate into layers. The phenol layer was then shaken with 101 parts fresh hexane at 35° C. The phenol layer from this second treatment was distilled at 20 mm. pressure to obtain phenol which met U. S. P. specifications in an amount corresponding to 65% of the crude phenol treated.

Example IV

Crude phenol similar to that of Example I was mixed with water to make 90.9% phenol. This was then countercurrent extracted in a Scheibel column having 14 agitation stages using a hexane fraction as the extractant. The phenol entered the center of the column, hexane entered the bottom, and water amounting to about 9% of the phenol feed entered at the top. Using 1 part hexane to 2.6 parts phenol in the extraction the phenol layer removed at the bottom of the column on distillation through a 50 plate column gave a 68% yield of U. S. P. specification phenol.

The hexane used in the process of this invention is a hydrocarbon fraction commonly known as hexane. Such a fraction is a mixture of hexane isomers boiling in the range of about 62° C. to about 67° C. Commercial "hexane" is particularly satisfactory.

The phenol is contacted with hexane either in a two-phase system or in a single-phase system. For instance, phenol and the hexane may be heated to dissolution temperature and the resulting solution may be cooled to a temperature at which the phenol is incompletely soluble in the hexane so as to cause separation of layers, or the phenol can be rendered less soluble in the hexane by the presence of water, and the phenol phase may then be agitated with the hexane and subsequently be allowed to stand to effect separation into two layers. Likewise, the water may be added to cause phase separation. The phenol is contacted with the hexane in the liquid phase and the liquid phase is maintained by proper choice of temperature. Water-free phenol, when melted, can be readily kept liquid in the presence of hexane so that the process of contacting with the hexane is readily carried out in a two-phase system at temperatures as low as about 35° C. This temperature may be lowered further without encountering crystallization if small amounts of water are added to the phenol. Moreover, the temperature may be elevated above the boiling point of the hexane if desired by the use of pressure. The temperature of separation into two layers or phases will vary with the presence or absence of water in the phenol. The temperature will be a temperature in the range of about 0° C. to about 90° C. such that separation into two phases occurs. Temperatures in the range of 35°-51° C. are operable with water-free phenol. The preferred temperature range is about 0° C. to about 40° C. with phenol containing small amounts of water.

When water is added to the phenol, 10% is a satisfactory amount. While more may be used, it is uneconomical and undesirable to do so since the water must be subsequently removed from the phenol and it is advantageous to use as little water as possible to effect phase separation.

The process of this invention is particularly applicable to phenol produced by oxidation of cumene to the hydroperoxide followed by cleavage of the hydroperoxide. It is applicable not only in the case where the cumene used was pure cumene but also where the cumene used was prepared by alkylation with refinery gases containing butylenes. Thus, the process of this invention is also applicable for removal of genetic impurities derived not only from cumene but from the butyl benzenes as well. The term "genetic impurities" as used herein, therefore, includes such impurities as are so derived from butyl benzene alone and as contaminants of cumene subjected to the oxidation step. Moreover, genetic impurities removable from phenol by the present process also includes those formed in the cracking of the phenol residues which contain 7-hydroxycumene, cumylphenol and α-hydroxy-p-isopropylcumylphenol and which yield therefrom α-methylstyrene and p-isopropenyl-α-methylstyrene as genetic impurities in the phenol also produced in the cracking operation. Mesityl oxide is also formed from acetone in the cleavage process and it also contaminates the phenol and is not separable by distillation. Such impurities formed as by-products in the phenol process all boil slightly above or below the boiling point of phenol or form azeotropes boiling slightly above or below the boiling point of phenol and are the type of genetic impurities which are removed from the phenol in the process of this invention.

The process of this invention may be carried out in a batch process and the contacting step and separation step can be repeated, if desired. The process may also be carried out in a countercurrent extraction column or tower.

The process of this invention using hexane is particularly satisfactory for removal of genetic impurities from phenol produced in the process of oxidizing cumene containing butyl benzenes to the hydroperoxide followed by acid catalyzed cleavage of the hydroperoxide and this process using hexane is particularly adapted to purification for the production of phenol meeting U. S. P. specifications. The use of a hexane boiling in the range of 62°–67° C. is particularly critical in a commercial process since higher boiling hydrocarbons and lower boiling hydrocarbons have not successfully accomplished the same result.

What I claim and desire to protect by Letters Patent is:

1. The method of purifying phenol obtained in the process of oxidation of an alkyl benzene consisting essentially of cumene and cleavage of the resulting hydroperoxide, and containing a genetic impurity of the group consisting of α-methylstyrene and mesityl oxide which comprises contacting said impure phenol in the liquid phase with a hexane boiling in the range of about 62° C. to about 67° C., allowing the resulting mixture to separate into a phenol phase and a hexane phase, and separating the phenol phase from the hexane phase.

2. The method of claim 1 in which the phenol is contacted with commercial hexane.

3. The method of purifying phenol obtained in the process of oxidation of an alkyl benzene consisting essentially of cumene and cleavage of the resulting hydroperoxide, and containing a genetic impurity of the group consisting of α-methylstyrene and mesityl oxide which comprises contacting said impure phenol in the liquid phase with a hexane boiling in the range of about 62° C. to about 67° C., cooling the mixture to a temperature at which phenol is incompletely soluble in the hexane, allowing the resulting mixture to separate into a phenol phase and a hexane phase, and separating the phenol phase from the hexane phase.

4. The method of claim 3 in which the phenol is contacted with commercial hexane and the temperature to which the mixture is cooled is about 35° C.

5. The method of purifying phenol obtained in the process of oxidation of an alkyl benzene consisting essentially of cumene and cleavage of the resulting hydroperoxide, and containing a genetic impurity of the group consisting of α-methylstyrene and mesityl oxide which comprises contacting said impure phenol in the liquid phase with a hexane boiling in the range of about 62° C. to about 67° C., allowing the resulting mixture to separate into a phenol phase and a hexane phase, separating the phenol phase, and distilling the phenol therefrom.

6. The method of purifying phenol obtained in the process of oxidation of an alkyl benzene consisting essentially of cumene and cleavage of the resulting hydroperoxide, and containing a genetic impurity of the group consisting of α-methylstyrene and mesityl oxide which comprises adding water in an amount up to about 10% of said phenol to the impure phenol, contacting the impure aqueous phenol in the liquid phase with a hexane boiling in the range of about 62° C. to about 67° C. at a temperature at which phenol dissolves incompletely in said hexane, allowing a phenol phase and a hexane phase to separate, and separating the phenol phase from the hexane phase.

References Cited in the file of this patent

UNITED STATES PATENTS

| | | |
|---|---|---|
| 2,382,944 | Porter | Aug. 14, 1945 |
| 2,459,540 | Rosenwald | Jan. 18, 1949 |
| 2,597,497 | Joris | May 20, 1952 |
| 2,628,983 | Aller et al. | Feb. 17, 1953 |